United States Patent
Domene Figuerola et al.

(10) Patent No.: US 12,365,613 B2
(45) Date of Patent: Jul. 22, 2025

(54) METHOD FOR CLEANING PROCESS WATER CIRCULATED IN A PAPER RECYCLING SYSTEM USING ENZYMES

(71) Applicant: Meri Environmental Solutions GmbH, Munich (DE)

(72) Inventors: Luis Domene Figuerola, Munich (DE); Henning Laubrock, Munich (DE); George Troubounis, Munich (DE)

(73) Assignee: Meri Environmental Solutions GmbH, Munich (DE)

( * ) Notice: Subject to any disclaimer, the term of this patent is extended or adjusted under 35 U.S.C. 154(b) by 708 days.

(21) Appl. No.: 17/429,482

(22) PCT Filed: Feb. 5, 2020

(86) PCT No.: PCT/EP2020/052911
§ 371 (c)(1),
(2) Date: Aug. 9, 2021

(87) PCT Pub. No.: WO2020/165007
PCT Pub. Date: Aug. 20, 2020

(65) Prior Publication Data
US 2022/0106210 A1  Apr. 7, 2022

(30) Foreign Application Priority Data
Feb. 15, 2019  (DE) .................. 10 2019 001 127.9

(51) Int. Cl.
*C02F 3/34* (2023.01)
*C02F 1/50* (2023.01)
(Continued)

(52) U.S. Cl.
CPC ............. *C02F 3/342* (2013.01); *C02F 1/50* (2013.01); *C02F 1/66* (2013.01); *C02F 3/286* (2013.01);
(Continued)

(58) Field of Classification Search
CPC .......... C02F 2103/28; C02F 3/28; C02F 1/24; C02F 1/66; C02F 1/50; C02F 3/286; C02F 2305/06
(Continued)

(56) References Cited

U.S. PATENT DOCUMENTS

| 4,609,460 A | 9/1986 | Vellinga |
| 4,663,043 A | 5/1987 | Molin et al. |

(Continued)

FOREIGN PATENT DOCUMENTS

| CN | 101341098 A | 1/2009 |
| CN | 102351321 A | 2/2012 |

(Continued)

OTHER PUBLICATIONS

Arai et at, JP 2001207391A English machine translation, pp. 1-16 (Year: 2001).*

(Continued)

*Primary Examiner* — Claire A Norris
(74) *Attorney, Agent, or Firm* — Anderson Patent Law Firm

(57) ABSTRACT

The present invention relates to a method for cleaning process water circulated in a paper recycling system, comprising a process water treatment step, which comprises at least one pre-acidification step and at least one anaerobic cleaning step, wherein at least some of the process water to be cleaned is subjected to hydrolysis and acidification in the at least one pre-acidification step and the process water thus treated is then brought into contact with anaerobic microorganisms in the at least one anaerobic cleaning step in order to break down impurities in the process water, wherein at least one saccharide-splitting enzyme is added to the process water before or during the pre-acidification step, and the pH of the process water is set to 8.0 or lower at least during the (Continued)

at least one pre-acidification step and during the at least one anaerobic cleaning step.

20 Claims, 3 Drawing Sheets

(51) Int. Cl.
    *C02F 1/66* (2023.01)
    *C02F 3/28* (2023.01)
    *C02F 103/28* (2006.01)

(52) U.S. Cl.
    CPC ...... *C02F 2103/28* (2013.01); *C02F 2305/06* (2013.01)

(58) Field of Classification Search
    USPC .......................................... 210/632; 162/161
    See application file for complete search history.

(56) References Cited

U.S. PATENT DOCUMENTS

| | | |
|---|---|---|
| 5,338,447 A | 8/1994 | Vellinga |
| 5,549,833 A * | 8/1996 | Hagimori ................ C01B 17/90 |
| | | 210/757 |
| 6,478,963 B1 | 11/2002 | Rossmanith |
| 8,211,305 B2 | 7/2012 | Menke et al. |
| 2010/0025325 A1 | 2/2010 | Menke et al. |
| 2012/0103882 A1 | 5/2012 | Hamann |
| 2012/0145629 A1* | 6/2012 | Troubounis ............... C02F 3/28 |
| | | 210/605 |
| 2017/0175333 A1* | 6/2017 | Tu ......................... D21H 17/28 |

FOREIGN PATENT DOCUMENTS

| | | |
|---|---|---|
| DE | 4141832 C1 | 5/1993 |
| DE | 102008028003 A1 | 12/2009 |
| DE | 102009019428 A1 | 11/2010 |
| EP | 0134766 A1 | 7/1984 |
| EP | 0170332 A1 | 7/1985 |
| EP | 0539430 B1 | 7/1991 |
| EP | 1071636 B1 | 4/1999 |
| JP | 2001207391 A * | 8/2001 |
| WO | 88/04282 | 6/1988 |
| WO | WO-8804282 A1 * | 6/1988 |
| WO | 2016/139377 A1 | 9/2016 |

OTHER PUBLICATIONS

Zheng, Y. et al. "Agricultural Microbiology and Technology Application", 2016, Jilin University, pp. 150-151—Machine Generated English Translation.

* cited by examiner

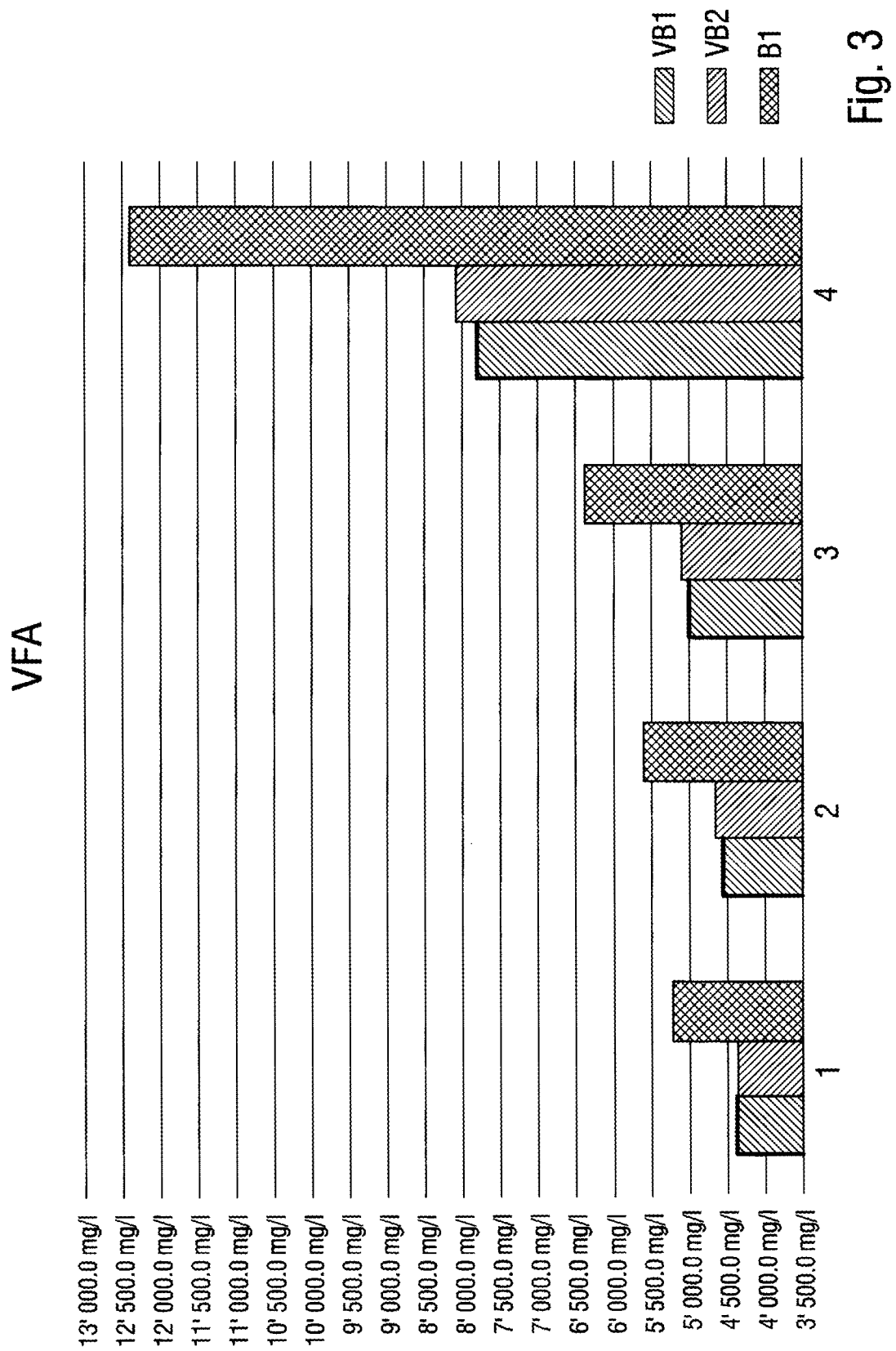

METHOD FOR CLEANING PROCESS WATER CIRCULATED IN A PAPER RECYCLING SYSTEM USING ENZYMES

The present invention relates to a method for cleaning process water circulated in a paper recycling system, in particular for the continuous cleaning of process water in the production of paper from recycled paper, in which at least some of the process water to be cleaned is subjected to hydrolysis and acidification in a pre-acidification step and the process water thus treated is then brought into contact with anaerobic microorganisms in an anaerobic cleaning step in order to break down impurities in the process water.

A treatment of process water is necessary in many technical fields, in particular in those cases in which the process water is circulated in the corresponding system in order to prevent the process water from being enriched with contaminants. This also applies in particular to the process water in paper production, both in paper production from virgin fibers and in particular in paper production from recycled paper. In recent decades, paper has been increasingly obtained from recycled paper in order to reduce the energy consumption in paper production and in particular to reduce the consumption of natural resources. When producing paper from recycled paper, the recycled paper is first mixed with water and comminuted in a pulper by stirring and mixing in order to break up the individual fiber composites. The fibers are then cleaned in order to remove non-fibrous foreign bodies from the pulp before the fibers are optionally decolored and finally, after adding a small proportion of primary fibers, processed into paper on a paper machine. A corresponding system therefore comprises a device for treating recycled paper and a paper machine, wherein the recycled paper treatment device has a recycled paper disintegration unit or a pulper in which process water is supplied to the recycled paper to dissolve and comminute the fibers, a sorting device for removing contaminants, and a dewatering unit for removing process water. In order to be able to circulate the process water and thus minimize the addition of fresh water, the process water must be cleaned to a required extent. For this purpose, a process water treatment method is usually used in the process water treatment units.

A large number of mechanical, chemical, and biological methods and corresponding reactors are known for cleaning process water. In biological process water cleaning, the process water to be cleaned is brought into contact with aerobic or anaerobic microorganisms which break down the organic impurities in the process water mainly into carbon dioxide and water in the case of aerobic microorganisms and mainly into carbon dioxide and methane in the case of anaerobic microorganisms. Biological process water cleaning methods have recently been increasingly carried out with anaerobic microorganisms because in anaerobic process water cleaning, oxygen does not have to be introduced into the bioreactor at high energy input and high-energy biogas is generated during the cleaning, which can then be used to generate energy. Depending on the type and shape of the biomass used, the reactors for anaerobic process water cleaning are divided into contact sludge reactors, UASB reactors, EGSB reactors, fixed bed reactors, and fluidized bed reactors. While the microorganisms in fixed bed reactors adhere to stationary carrier materials and the microorganisms in fluidized bed reactors adhere to small, freely movable carrier material, the microorganisms in UASB and EGSB reactors are used in the form of so-called pellets.

Such methods and corresponding reactors are described, for example, in EP 0 170 332 A1, in EP 1 071 636 B1, and in EP 0 539 430 B1.

It is also known that, prior to being fed into an anaerobic reactor, the process water to be cleaned is fed into a pre-acidification reactor in which hydrolysis and acidification take place by hydrolyzing and acidifying bacteria. While polymers such as polysaccharides, polypeptides and fats are broken down into their monomers such as sugars, amino acids and fatty acids during hydrolysis, these monomers are converted into organic acids, alcohols, aldehydes, hydrogen, and carbon dioxide during acidification. A first pre-cleaning is therefore already taking place in the pre-acidification reactor. In addition, suitable growth conditions for the anaerobic microorganisms used in the subsequent anaerobic reactor can be set in the pre-acidification reactor by adding suitable nutrients and trace elements. For example, the process water accumulating in the paper industry usually has very few nitrogen and phosphorus compounds, so that they have to be added to the process water before it is fed into the anaerobic reactor in order to ensure optimal growth of the microorganisms in the anaerobic reactor. The pH values of the process water to be purified, which are suitable for the growth of the microorganisms in the subsequent anaerobic reactor, can also be set in the pre-acidification reactor by adding appropriate pH-adjusting agents. Acetogenesis then takes place in the anaerobic reactor, in which the organic acids generated during acidification are primarily converted into acetic acid, before the acetic acid is converted into methane and carbon dioxide in the subsequent methanogenesis.

Biocide is added to the process water, in particular when producing paper from recycled paper. This is necessary because recycled paper has starch on its surface, which was applied to the paper during paper production in order to improve the strength and smoothness of the paper. Therefore, starch dissolves in the process water during the treatment of recycled paper. However, starch is a good nutrient for microorganisms and without adding biocide to the process water, microorganisms would multiply in an uncontrolled manner in the process water during the treatment of recycled paper. Due to the multiplication of the microorganisms, the pH of the process water would also decrease, with the result that lime on the surface of the recycled paper, which was used as a filler in paper production, would increasingly go into solution and interfere with the paper production process through undesirable, uncontrolled deposits and cause problems in the process water cleaning steps, in particular the anaerobic cleaning step because, among other things, the lime could precipitate on the microorganism pellets and thus encapsulate the microorganisms. For this reason, biocide is added to the process water. However, the biocide contained in the process water disrupts or impedes the pre-acidification, presumably because it inhibits hydrolysis. Tests by the inventors have shown that for the process water mixed with biocide in a machine for producing paper from recycled paper, no significant hydrolysis and acidification takes place even after adding nutrients for the pre-acidification bacteria, such as urea and phosphoric acid as nitrogen and phosphorus sources.

Therefore, the problem addressed by the present invention is that of providing a simple and cost-effective method for cleaning process water circulated in a paper recycling system, in which the pre-acidification and subsequent anaerobic cleaning take place effectively and reliably despite the biocide contained in the process water and in particular also without a complex control of the biocide concentration.

According to the invention, this problem is solved by a method according to patent claim 1 and in particular by a method for the preferably continuous cleaning of process water circulated in a paper recycling system (in particular a system for producing paper from recycled paper), comprising a process water treatment step, which comprises as substeps at least one pre-acidification step and at least one anaerobic cleaning step, wherein at least some of the process water to be cleaned is subjected to hydrolysis and acidification in the at least one pre-acidification step and the process water thus treated is then brought into contact with anaerobic microorganisms in the at least one anaerobic cleaning step in order to break down impurities in the process water, wherein at least one saccharide-splitting enzyme is added to the process water before or during the at least one pre-acidification step, and the pH of the process water is set to 8.0 or lower at least during the at least one pre-acidification step and during the at least one anaerobic cleaning step. The pH of the process water is preferably set to 8.0 or lower at least from the beginning of the at least one pre-acidification step until the end of the at least one anaerobic cleaning step, i.e., also during possible further substep(s) carried out between the at least one pre-acidification step and the at least an anaerobic cleaning step.

This solution is based on the surprising finding that the presence of one or more saccharide-splitting enzymes during the pre-acidification step compensates for an impairment of the hydrolysis and subsequent acidification in the pre-acidification step by the biocide contained in the process water and therefore, an effective and reliable hydrolysis and acidification take place despite the presence of the biocide. As a result, an effective and reliable pre-acidification is achieved even without a complex control of the biocide concentration in the process water. This method is therefore also particularly suitable for cleaning process water which is circulated for a long time without adding large amounts of fresh water. For this reason, the method according to the invention is eminently suitable for cleaning process water in the production of paper from recycled paper.

A saccharide-splitting enzyme refers to an enzyme which splits or breaks down the saccharide into two or more fragments, in particular by separating one or more covalent bonds of the saccharide. A saccharide-splitting enzyme can therefore also be called a saccharide-degrading enzyme or a saccharide-decomposing enzyme.

According to the invention, the method for cleaning process water circulated in a paper recycling system (preferably a system for producing paper from recycled paper) comprises a process water treatment step which, as substeps, comprises at least one pre-acidification step, preferably exactly one pre-acidification step, and at least one anaerobic cleaning step, preferably exactly one anaerobic cleaning step. In principle, the present invention is not restricted with regard to the part of the paper recycling system, from which the process water is fed to the process water treatment step. The process water is preferably fed to the process water treatment step from at least one unit of at least one stage of the paper recycling system or recycled paper treatment device and, after the process water treatment step, is fed back to at least one unit of at least one stage of the recycled paper treatment device, wherein the unit is selected from one or more of a pulper, a sorting device, a dewatering unit, and an oxidation/reduction unit.

The recycled paper treatment device can have one or more stages, wherein at least one of these stages or a plurality of these stages or all of these stages comprise a separate process water treatment unit in which a process water treatment step comprising at least one pre-acidification step and at least one anaerobic cleaning step is carried out. For example, the recycled paper treatment device comprises two stages, wherein the first stage comprises a pulper, a sorting device and a dewatering unit, and the second stage comprises a sorting device, an oxidation/reduction unit, and a dewatering unit. Each of the stages includes a process water treatment unit. In this case, process water can be fed from all of these units to the process water treatment steps carried out in the process water treatment units, i.e., fed from the pulper, the sorting device and the dewatering unit to the process water treatment step for the first stage and from the sorting device, the oxidation/reduction unit and the dewatering unit to the process water treatment step for the second stage of the recycled paper treatment device. However, it is also possible, albeit less preferred, for process water to be fed to the process water treatment steps only from individual units, for example, process water from the pulper is fed to the process water treatment step for the first stage of the recycled paper treatment device, and process water from the dewatering unit is fed to the process water treatment step for the second stage of the recycled paper treatment device.

According to the invention, the pH of the process water is set to 8.0 or lower at least during the at least one pre-acidification step and during the at least one anaerobic cleaning step and preferably at least from the beginning of the at least one pre-acidification step to the end of the at least one anaerobic cleaning step. In the context of the present invention, setting the pH means that the method is operated such that the process water has such a pH. This does not necessarily mean that a pH-adjusting agent has to be added to the process water if the method results in such a pH even without the addition of a pH-adjusting agent.

The pH of the process water is preferably set from 4.0 to 8.0 and particularly preferably from 5.5 to 7.5 at least during the at least one pre-acidification step and during the at least one anaerobic cleaning step and preferably at least from the beginning of the pre-acidification step to the end of the anaerobic cleaning step.

In order to achieve an efficient hydrolysis and acidification in the at least one pre-acidification step, it is proposed in a development of the inventive concept that, before the pre-acidification, the process water is set, by cooling or heating, to a temperature in the range from 25 to 40° C., preferably from 30 to 38° C., particularly preferably from 36 to 38° C., and very particularly preferably to about 37° C.

Furthermore, it is preferred that, before the pre-acidification, the process water is set to a pH in the range from 4.0 to 7.0, particularly preferably from 5.7 to 7.0 and most preferably from 5.7 to 6.7. As stated above, the pH of the process water can be set to the aforementioned values by adding a pH-adjusting agent, which, however, is not necessarily required.

After the at least one pre-acidification step (preferably exactly one pre-acidification step), at least one anaerobic cleaning step (preferably exactly one anaerobic cleaning step) is carried out in the process water treatment step. The first of the at least one anaerobic cleaning step is preferably carried out directly after the last of the at least one pre-acidification step, i.e., between the last of the at least one pre-acidification step and the first of the at least one anaerobic cleaning step, no other cleaning substep is carried out.

Before and/or during the anaerobic cleaning step, the process water is set to a pH in the range from 4.0 to 8.0, preferably from 5.7 to 7.5, and particularly preferably from 6.4 to 7.5. As stated above, the pH of the process water can be set to the aforementioned values by adding a pH-adjusting agent, which, however, is not necessarily required.

Particularly good results are achieved if the pH of the process water is set from 4.0 to 8.5 during the entire process water treatment step. In other words, while the pH of the process water is 8.0 or lower at least from the beginning of the at least one pre-acidification step to the end of the at least one anaerobic cleaning step, the pH in any other substeps of the process water treatment step, such as the decalcification step described below, is 4.0 to 8.5.

In a development of the inventive concept, it is proposed that during the entire process water treatment, i.e., during the entire process water treatment step, neither an alkaline hydrolysis (i.e., no hydrolysis at a pH of at least 9.0 or even at least 10.0) nor a chemical hydrolysis is carried out.

The process water preferably contains one or more biocides, preferably less than 1.0 to 8.0 and preferably 1.0 to 4.0 kg per ton of paper produced.

Good results are obtained in particular when the process water contains glutaraldehyde, 2-bromo-2-nitropropane-1,3-diol (known as bronopol), an isothiazolinone compound, a quaternary ammonium compound, a bromine compound, a chlorine compound and/or a peroxy compound, such as ammonium bromide and/or stabilized peroxyacetic acid, as the biocide.

According to a particularly preferred embodiment of the present invention, it is provided that, before or during the pre-acidification step, at least one polysaccharide-splitting enzyme is added to the process water to be treated.

Before or during the pre-acidification step, at least one polysaccharide-splitting enzyme is added to the process water to be treated, which is selected from the group consisting of amylases, cellulases, glucoamylases, xylanases, alpha-galactosidases, and any combination of two or more of the aforementioned enzymes.

Good results are obtained, for example, if a mixture containing cellulase and amylase, such as a mixture of cellulase, amylase, glucoamylase, xylanase and alpha-galactosidase, is added to the process water to be treated before or during the pre-acidification step. As a result, the polysaccharides contained in the process water to be treated and, in particular, the cellulose and starch that accumulate in the process water during recycled paper production are reliably split.

The amount of each of the polysaccharide-splitting enzymes added is preferably 1 to 100,000 units per liter of the process water to be treated, wherein one unit of enzyme is the amount of enzyme which converts 1 μmol of substrate per minute under the present conditions.

In addition to at least one polysaccharide-splitting enzyme or even instead of at least one polysaccharide-splitting enzyme, one or more oligosaccharide-splitting enzymes can be added to the process water to be treated before or during the pre-acidification step. In the context of the present invention, oligosaccharide refers to saccharides which comprise two to ten interconnected saccharide residues, whereas polysaccharide refers to saccharides which comprise more than ten interconnected saccharide residues.

In this embodiment, good results are obtained in particular if, before or during the pre-acidification step, at least one oligosaccharide-splitting enzyme is added to the process water to be treated, which is selected from the group consisting of lactases, maltases, invertases, and a combination thereof.

The amount of each of the oligosaccharide-splitting enzymes added is preferably 1 to 10,000 and particularly preferably 1 to 1,000 units.

For example, a mixture containing lactase, maltase and invertase can be added to the process water to be treated before or during the pre-acidification step.

According to an alternative, particularly preferred embodiment, a mixture containing cellulase, amylase, lactase and maltase, such as a mixture of cellulase, amylase, glucoamylase, xylanase, alpha-galactosidase, lactase, maltase and invertase, can be added to the process water to be treated before or during the pre-acidification step.

In a development of the inventive concept, it is proposed that, in addition to the at least one saccharide-splitting enzyme, at least one lipase is added to the process water to be treated before or during the pre-acidification step, The amount of lipase added is preferably 1 to 100,000 and particularly preferably 10 to 10,000 units.

Furthermore, in addition to the at least one saccharide-splitting enzyme, it has proven advantageous to add at least one protease to the process water to be treated before or during the pre-acidification step.

The amount of protease added is preferably 1 to 1,000,000 and particularly preferably 100 to 100,000 units.

According to a particularly preferred embodiment of the present invention, it is provided that at least one polysaccharide-splitting enzyme and at least one lipase are added to the process water to be treated before or during the pre-acidification step.

Particularly good results are obtained if, before or during the pre-acidification step, at least one polysaccharide-splitting enzyme, at least one lipase and at least one protease are added to the process water to be treated.

It is even more preferred if, before or during the pre-acidification step, at least one polysaccharide-splitting enzyme, at least one oligosaccharide-splitting enzyme, at least one lipase and at least one protease are added to the process water to be treated.

According to a particularly preferred embodiment of the present invention, it is provided that, before or during the pre-acidification step, a mixture containing cellulase, amylase, glucoamylase, xylanase, alpha-galactosidase, lactase, maltase, invertase, lipase and protease is added to the process water to be treated.

According to a most preferred embodiment of the present invention, at least one polysaccharide-splitting enzyme and preferably at least one amylase are added to the process water before or during the pre-acidification step, but no protease is added during the process water treatment step.

If more than one enzyme is added to the process water, the enzymes can be added together or separate from one another to the process water at one point before or during the pre-acidification.

Regardless of whether one or more different enzymes are added to the process water, each of the enzymes to be added can be added to the process water at two or more different points, i.e., several times. For example, a portion of each of the enzymes to be added can be added to the process water during the pre-acidification by means of a supply line into the pre-acidification reactor, whereas the other portion of each of the enzymes to be added is added to the process water after the pre-acidification and/or after the anaerobic cleaning step. The last enzyme added can then act on the process water until it returns to the pre-acidification reactor via the process water circuit.

In a development of the inventive concept, it is proposed that, before or during the pre-acidification step and before, during or after the enzyme addition, one or more nutrients are added to the process water in order to set optimal conditions for the effect of the hydrolysis and acidification bacteria. At least one nitrogen source, such as urea, and/or at least one phosphorus source, such as phosphoric acid, are preferably added as nutrients. A mixture of at least one nitrogen source and at least one phosphorus source is particularly preferably added as nutrients to the process water, and very particularly preferably a mixture of urea and phosphoric acid. Good results are obtained in particular if the ratio of chemical oxygen demand (COD) to nitrogen source to phosphorus source is set from 200:3:1 to 500:10:1, particularly preferably from 300:5:1 to 400:9:1, for example, at about 350:7:1.

In addition to the at least one pre-acidification step and the at least one anaerobic cleaning step, the process water treatment step of the method according to the invention can also comprise one or more other cleaning substeps, such as optionally one or more material recovery steps, one or more lime elimination steps and/or one or more filtration steps before the process water is fed back via a return line into, for example, the material treatment device of the recycled paper treatment device. In this embodiment, it is advantageous to add a portion of each of the enzymes to be added to the process water during the pre-acidification by means of supply line into the pre-acidification reactor, whereas the other portion of each of the enzymes to be added to the process water is added in the return line after the pre-acidification and/or after the anaerobic cleaning step. The last enzyme added can then act on the process water until it returns to the pre-acidification reactor via the return line and the material treatment device or the paper machine.

The process water treatment step preferably also comprises at least one, and preferably exactly one, decalcification step in order to reduce the quantity of lime circulated in the process water. If the lime concentration were too high, it would in particular not only disrupt the anaerobic cleaning step or the microorganisms used but also the paper production process through uncontrolled deposits.

A good decalcification efficiency is achieved in particular if the process water is subjected to a dissolved air flotation step in the decalcification step and in particular a dissolved air flotation step in which the pressure difference between the pressurization and the decompression is at least 2 bar, preferably at least 3 bar, particularly preferably at least 4 bar, and very particularly preferably at least 5 bar.

In the above embodiment, the process water is preferably fed to the decalcification step after the anaerobic cleaning step and the pH of the process water is set from 7.0 to 8.5 and preferably from 7.5 to 8.5 during the dissolved air flotation step.

In the following, the present invention will be described in more detail with reference to the drawings, in which:

FIG. 3 shows a diagram with the results of the examples.

Figure 1:
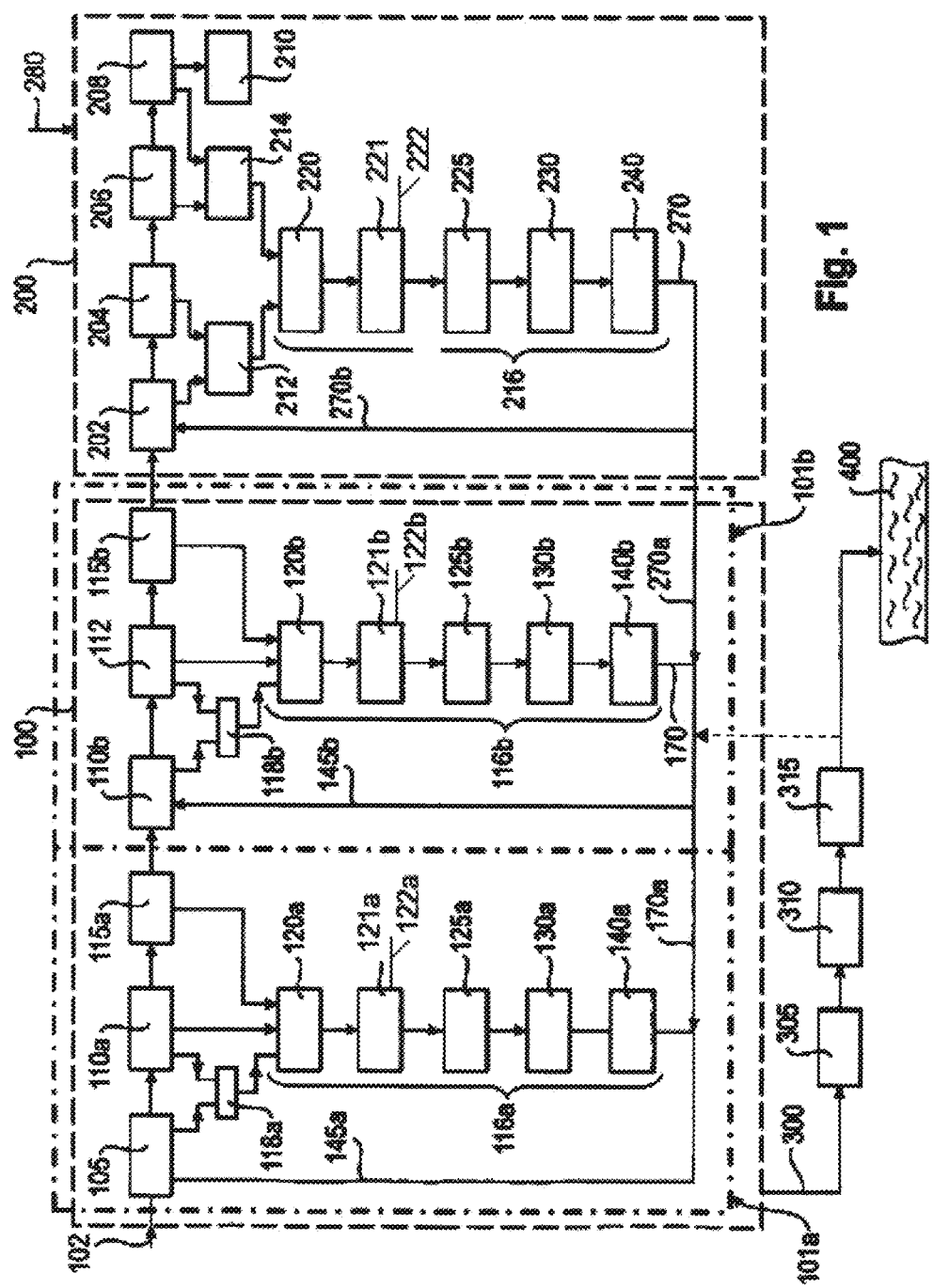
FIG. 1 is a schematic view of a system for producing paper from recycled paper according to an embodiment of the present invention.

The system shown in FIG. 1 comprises a recycled paper treatment device 100 and a paper machine 200 arranged downstream thereof and connected to the recycled paper treatment device 100. In this case, the recycled paper treatment device 100 comprises two stages or loops 101a and 101b that are essentially decoupled from one another and indicated in FIG. 1 by the dashed-dotted boxes.

The first stage 101a of the paper treatment device 100 comprises a raw material inlet 102, a pulper 105, a sorting device 110a and a dewatering unit 115a, which are arranged sequentially and connected to one another. In the context of the present invention, a pulper 105 not only refers to a device consisting of one device part, as shown schematically in FIG. 1, but in particular also to a device combination comprising a plurality of individual device parts, which contains all of the components or aggregates required for pulping. The same also applies to the sorting device 110a, the dewatering unit 115a and all other components shown in FIG. 1.

The pulper 105 and the sorting device 110a are each connected via a line to a reject handling unit 118a.

In addition, the first stage 101a of the recycled paper treatment device 100 comprises a process water treatment unit 116a which is supplied via corresponding lines from the reject handling unit 118a, from the sorting device 110a and from the dewatering unit 115a with the process water accumulating in these system parts. The process water treatment unit 116a consists of a material recovery unit 120a, a pre-acidification reactor 121a, an anaerobic reactor 125a mixed with anaerobic microorganisms, a lime elimination unit 130a and a filtration unit 140a, which are arranged sequentially and connected to one another. A return line 145a leads back from the filtration unit 140a to the pulper 105. In addition to the material recovery unit 120a or instead of the material recovery unit 120a, a material removal unit (not depicted) can be provided in the recycled paper treatment device 100. According to the invention, the pre-acidification reactor 121a has an enzyme supply line 122, via which one or more enzymes can be fed to the pre-acidification reactor 121a.

For the sake of completeness, it must be noted that the filtration unit 140a is optional and can also be omitted, i.e., the filtrate from the lime elimination unit 130a can be returned directly to the return line 145a. In addition, a centrifugal sorter can be provided before or after the sorting device 110a. Furthermore, the material recovery unit 120a can be combined with a material removal unit designed, for example, as a microflotation device. In addition, a temperature control unit for cooling or heating can be arranged between the material recovery unit 120a and the pre-acidification reactor 121a in order to set the optimal temperature of the process water for the pre-acidification stage. Finally, a further enzyme supply line can be provided which opens into the return line 145a in order to add a further enzyme to the process water, which remains in the process water until the process water again reaches the pre-acidification reactor 121a.

In contrast to the first stage 101a, the second stage 101b of the recycled paper treatment device 100 comprises a sorting device 110b connected to the dewatering unit 115a, an oxidation unit or a reduction unit 112 and a dewatering unit 115b, which are arranged sequentially and connected to one another. In addition, the second stage 101b has a process water treatment unit 116b which is constructed analogously to the process water treatment unit 116a of the first stage 101a, wherein the filtration unit 140b of the second stage 101b of the recycled paper treatment device 100 is connected to the sorting device 110b via a return line 145b and, via a partial flow line 170a, it is connected to the return line 145a of the first stage 101a, which comes from the filtration unit 140a, of the recycled paper treatment device 100. While the sorting device 110b and the oxidation unit or the reduction unit 112 are connected to a reject handling unit 118b via corresponding lines, the dewatering unit 115b is connected directly to the material recovery unit 120b of the process water treatment unit 116b. In addition, a line leads from the oxidation unit or the reduction unit 112 to the material recovery unit 120b.

For the sake of completeness, it must be noted that the filtration unit 140b is also optional and can also be omitted, i.e., the filtrate from the lime elimination unit 130b can be returned directly to the return line 145b. In addition, a centrifugal sorter can be provided before or after the sorting device 110b. Furthermore, the material recovery unit 120b can be combined with a material removal unit designed, for example, as a microflotation device. In addition, a temperature control unit for cooling or heating can be arranged between the material recovery unit 120a and the pre-acidification reactor 121b in order to set the optimal temperature of the process water for the pre-acidification stage. Finally, a further enzyme supply line can be provided which opens into the return line 145b in order to add a further enzyme to the process water, which remains in the process water until the process water again reaches the pre-acidification reactor 121b.

The paper machine 200 comprises a centrifugal sorter 202, a fine sorting device 204, a paper machine forming section 206, a paper machine press section 208 and a dryer section 210, which are arranged sequentially and connected to one another. The centrifugal sorter 202 and the fine sorting device 204 are connected to a reject handling unit 212 and the paper machine forming section 206 and the paper machine press section 208 are connected to a fiber recovery unit 214. In addition, the reject handling unit 212 and the fiber recovery unit 214 are connected via corresponding lines to a process water treatment unit 216 which consists of a material removal unit 220, a pre-acidification reactor 221, an anaerobic reactor 225 mixed with anaerobic microorganisms, a lime elimination unit 230, and a filtration unit 240. In addition, a return line 270 leads from the filtration unit 240 of the paper machine 200 into the line 170 of the second stage 101b of the recycled paper treatment device 100. The fiber recovery unit 214 and the material removal unit 220 can also be combined in a device part designed, for example, as a microflotation.

For the sake of completeness, it must be noted that a temperature control unit for cooling or heating can be arranged between the material removal unit 220 and the pre-acidification reactor 221 in order to set the optimal temperature of the process water for the pre-acidification stage. Finally, a further enzyme supply line can be provided which opens into the filtrate line after cooling in order to add a further enzyme to the process water, which remains in the process water until the process water reaches the pre-acidification reactor 221.

Furthermore, a fresh water supply line 280 is provided in the region of the paper machine 200, via which fresh water can be fed to the paper machine. The fresh water supply line 280 can open at different points into the paper machine 200, for example, into the supply line to the centrifugal sorter 202 and/or into the paper machine forming section 206 and/or the paper machine press section 208, which is why the exact position of the fresh water supply line 280 is not shown in FIG. 1. In addition, a process water line 300 is provided in the system, via which excess process water can be discharged from the system. The process water line 300 can also be arranged at different positions in the system, for example, on the line 170, which is why the exact position of this process water line 300 is also not shown in FIG. 1. The process water line for excess process water 300 leads into a mechanical material removal unit 305 which is followed by a cooling unit 310 and a biological treatment unit 315. From the biological treatment unit 315, which can comprise a lime elimination unit and a filtration unit, a line leads either into a communal (or collective) sewage treatment plant for further cleaning or into a public body of water 400, for example, into a river; however, a partial flow or all of the treated process water can be returned to the paper machine or the material treatment, if required.

During operation of the system, recycled paper is continuously introduced via the raw material inlet 102 into the pulper 105 of the first stage 101a of the recycled paper treatment device 100, in which the recycled paper is mixed with process water supplied via the return line 145a and comminuted to extract the fibers. While the fibers obtained in the pulper 105 are continuously transferred as a fiber suspension into the sorting device 110a, the process water accumulating in the pulper 105, which may contain fiber residues, is first fed into the reject handling unit 118a and from there, after separation of the rejects, into the material recovery unit 120a of the process water treatment unit 116a of the recycled paper treatment device 100. In the sorting device 110a, light or heavy irregularities that are larger than fibers, such as, for example, coarse contaminants in the form of plastic films and pieces of plastic, are sorted out from the fiber suspension, for example, by means of sieve barriers and typically in several stages. In addition, a flotation can also be carried out in the sorting device 110a for the purpose of eliminating pigments, ink and color particles (de-inking). In addition, fines and ash can be separated during pulp washing. In the dewatering unit 115a arranged downstream of the sorting device 110a, which is preferably designed as a dewatering filter and/or as a screw press, the fiber suspension is thickened by removing process water in order to be transferred as a thickened fiber suspension from the dewatering unit 115a into the sorting device 110b of the second stage 101b of the recycled paper treatment device 100. A partial flow of the process water accumulating in the sorting device 110a is fed into the reject handling unit 118a, whereas the other partial flow of the process water accumulating in the sorting device 110a, together with the process water accumulating in the dewatering unit 115a of the first stage 101a, is fed via corresponding lines directly into the material recovery unit 120a of the process water treatment unit 116a of the first stage 101a of the recycled paper treatment device 100, in which fibrous materials contained in the process water are separated and fed back to the treatment process. The material recovery unit 120a is preferably designed as a dissolved air flotation device.

In the system shown in FIG. 1, the process water accumulating in the reject handling unit 118a is fed into the material recovery unit 120a. From the material recovery unit 120a, process water freed from fibrous materials is first fed into the pre-acidification reactor 121a in which the process water is subjected to hydrolysis and acidification. According to the invention, at least one saccharide-splitting enzyme, preferably a mixture of at least one polysaccharide-splitting enzyme, at least one oligosaccharide-splitting enzyme, at least one lipase and at least one protease, and most preferably at least one amylase, but no protease, is fed to the pre-acidification reactor 121a via the enzyme supply line 122. The enzyme(s) can be fed to the pre-acidification reactor 121a as a solid or preferably as an aqueous solution. A cooling or heating unit (not depicted) can be connected upstream of the pre-acidification reactor 121a for the purpose of setting the process water to an optimal temperature range. The process water is then fed into the anaerobic reactor 125a which has been mixed with anaerobic microorganisms and in which chemical and biological impurities are split up by the effect of the anaerobic microorganisms in the process water. From the anaerobic reactor 125a, the process water thus freed from the chemical and biological impurities is fed into the downstream lime elimination unit 130a which is preferably designed as a dissolved air flotation device. In this lime elimination unit 130a, the carbonates and hydrogen carbonates present in the process water are largely precipitated as lime and removed from the process water. In addition, a so-called "flash oxidation" takes place in the lime elimination unit 130a, during which metabolic end products of the microorganisms formed in the anaerobic reactor 125a are oxidized by the dissolved air supply or by air oversaturation, whereby an additional oxidative breakdown of the pollutants and/or contaminants in the process water takes place and an odor emission is largely reduced. The lime precipitation takes place by shifting the lime-carbonic acid balance, which can be achieved either by adding suitable chemicals, in particular a pH-adjusting agent, by means of which the pH of the process water is set to a neutral or slightly alkaline value which is preferably between 7.5 and 8.5, or by stripping in that the dissolved carbon dioxide, which is a product of the metabolism of the microorganisms in the anaerobic reactor, is vented. Carbon dioxide has a relatively high solubility in water, which is why the filtrate from the anaerobic reactor is saturated with carbon dioxide. This carbon dioxide is stripped out in the stripping reactor by the intensive mixture and the air supply. The stripping of the carbon dioxide causes a shift in the pH towards alkaline. The resulting higher pH in turn causes the calcium to precipitate in the form of lime. In addition, precipitation and/or flocculation reagents can also be added to the process water for this purpose in order to facilitate the precipitation of lime and the formation of lime flakes in a size suitable for an effective separation. In addition, compressed gas, for example, compressed air, is introduced into the dissolved air flotation device, and the mixture thus produced is pressurized before this mixture is exposed to a reduced pressure. As a result, the compressed gas bubbles up from the mixture and flows upwards in the device in the form of small bubbles, as a result of which solids, in particular the lime flakes formed, are entrained and separated from the process water. From the lime elimination device 130a, the purified process water thus decalcified is fed to a filtration unit 140a which is designed, for example, as a sand filtration unit in order to remove the remaining particulate material from the process water. In addition, the filtration unit 140a can have a desalination unit (not depicted) connected downstream.

The process water purified and decalcified in the process treatment unit 116a of the first stage 101a of the recycled paper treatment device 100 is returned to the pulper 105 via the return line 145a.

The thickened fiber suspension discharged from the dewatering unit 115a of the first stage 101a of the recycled paper treatment device 100 reaches the sorting stage 110b and from there, it is fed to an oxidation unit or a reduction unit 112 before the fiber suspension is thickened in the dewatering unit 115b of the second stage 101b in order to remove as much of the process water as possible from the fiber suspension. Analogous to the first stage 101a of the recycled paper treatment device 100, the process water accumulating in the sorting device 110b and a partial flow of the process water accumulating in the oxidation unit or the reduction unit 112 are fed into the reject handling unit 118b and the process water accumulating therein is fed into the material recovery unit 120b. The other partial flow of the process water accumulating in the oxidation unit or the reduction unit 112 and the process water accumulating in the dewatering unit 115b are fed directly into the material recovery unit 120b of the process water treatment unit 116b of the second stage 101b of the recycled paper treatment device 100 and cleaned and decalcified in the process water treatment unit 116b.

Most of the process water thus treated returns from the filtration unit 140b via the line 170 and the return line 145b to the sorting device 110b, whereas a possible excess of process water is returned via the partial flow line 170a to the first stage 101a of the recycled paper treatment device 100 and fed into the return line 145a leading to the pulper 105.

In the paper machine 200, the thickened pulp suspension continuously supplied from the dewatering unit 115b is turned into paper by means of the centrifugal sorter 202, in which parts with a higher or lower specific weight than water are separated, the fine sorting device 204, the paper machine forming section 206, the paper machine press section 208 and the dryer section 210. While the process water accumulating in the system parts 202 and 204 is fed into the reject handling unit 212, the process water accumulating in the system parts 206 and 208 is fed into the fiber recovery unit 214. While the rejects are dewatered in the reject handling unit 212, the process water originating from the paper machine forming section 206 and the paper machine press section 208 is subjected to a pre-removal process in the fiber recovery unit 214 and fibers are separated therefrom. Process water accumulating in the reject handling unit 212 and the fiber recovery unit 214 is continuously fed into the process water treatment unit 216 of the paper machine 200, where it flows sequentially through the material removal unit 220, the optional cooling or heating unit, pre-acidification reactor 221, in which the enzyme is added to the process water, the anaerobic reactor 225, the lime elimination unit 230 and the filtration unit 240, which operate similar to the previously described corresponding system parts of the process water treatment units 116a, 116b of the recycled paper treatment device 100. Alternatively, the process water accumulating in the reject handling unit 212 can be discharged from the system as waste water and only the process water accumulating in the fiber recovery unit 214 can be guided continuously through the process water treatment unit 216 of the paper machine 200. The purified and decalcified process water removed from the filtration unit 240 is, for the most part, returned to the centrifugal sorter 202 of the paper machine 200 via the return line 270 and the partial flow line 270b, whereas a possible excess of process water is fed via the partial flow line 270a into the line 170 coming from the filtration unit 140b of the second stage 101b of the recycled paper treatment device 100.

A completely closed process water circuit is basically possible but in the long run, it would lead to the accumulation of contaminants, which would ultimately impair the profitability of the system. A relatively small proportion of fresh water, based on the amount of water evaporating in the dryer section, is continuously fed to the process, preferably to the paper machine 200, via the fresh water supply line 280. For productions with specific requirements for low contaminant content, such as salts, a corresponding amount of process water can be removed from the process via the process water line 300 and further purified via the material removal unit 305, the cooling unit 310, and the biological treatment unit 315, which can also comprise a lime elimination unit and/or a filtration unit, before this flow is discharged as wastewater into public sewer systems or bodies of water 400. In addition, as mentioned above, the process water optionally discharged from the reject handling units 118a, 118b, 212 can also be removed from the process via the process water line 300 and purified via the material removal unit 305, the cooling unit 310, and the biological treatment unit 315 and returned to the process.

In FIG. 1, the system comprises a two-stage material treatment. Of course, it is also possible to provide two or more parallel pulp treatments, in particular when producing multi-ply paper.

In the following, the present invention will be described in more detail using examples which illustrate but do not restrict the present invention.

EXAMPLES

Figure 2:
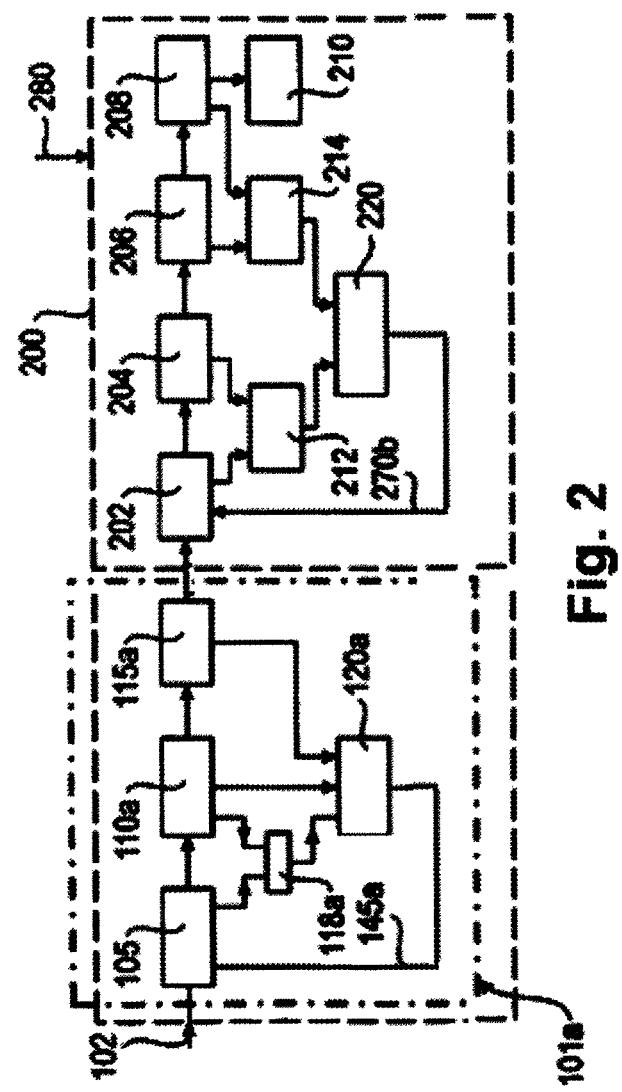
FIG. 2 is a schematic view of a system for producing paper from recycled paper, as it has been used for the examples.

In a system shown in FIG. 2, in which the depicted system parts correspond to those shown in FIG. 1 with the same reference signs, process water containing ammonium bromide in an amount of 5 kg/t paper was circulated as the biocide.

At the same time, three samples of process water were taken from the return line 145a. One sample was left untreated as comparative example 1. While urea and phosphoric acid were added as nutrients to the second sample as comparative example 2, wherein the ratio of COD to urea to phosphoric acid was set to 350:7:1, the third sample as example 1 was mixed with urea and phosphoric acid in the ratio COD to urea to phosphoric acid of 350:7:1 and the following enzymes were added in the following quantities (each per liter of process water):

fungal amylase 3000 DU,
maltase 89 DP,
cellulase 538 CU,
glucoamylase 9 AGU,
bromelain 112,000 PU,
fibrazyme 6 mg/l,
xylanase 1,795 XU,
invertase 67 XU,
lipase 471 FIP, and
alpha-galactosidase 90 GalU.

The samples were incubated at 37° C. in a shaker and samples were taken at 4 different times and examined with regard to the content of volatile fatty acids (VFA).

The results shown in FIG. 3 were obtained. In this case:
VB1 stands for comparative example 1,
VB2 stands for comparative example 3,
B1 stands for example 1,
1 stands for 2 hours,
2 stands for 4 hours,
3 stands for 6 hours, and
4 stands for 8 hours.

As can be seen from FIG. 3, only a very slow acidification of the polysaccharides to volatile fatty acids took place in the samples of comparative examples 1 and 2, in which the process water did not contain any saccharide-splitting enzymes, whereas the acidification in the samples of example 1, in which the process water contained saccharide-, protein- and lipid-splitting enzymes, was at all times significantly higher than in the comparative examples.

LIST OF REFERENCE SIGNS

100 Recycled paper treatment device
101a First stage of the recycled paper treatment device
101b Second stage of the recycled paper treatment device
102 Raw material inlet
105 Pulper
110a, 110b Sorting device
112 Oxidation unit/reduction unit
115a, 115b Dewatering unit
116a, 116b Process water treatment unit of the material/recycled paper treatment device
118a, 118b Reject handling unit
120a, 120b Material recovery unit
121a, 121b Pre-acidification reactor
122a, 122b Enzyme supply line
125a, 125b Anaerobic reactor
130a, 130b Lime elimination unit
140a, 140b Filtration unit
145a, 145b Return line
170 Line
170a Partial flow line
200 Paper machine
202 Centrifugal sorter
204 Fine sorting device
206 Paper machine forming section
208 Paper machine press section
210 Dryer section
212 Reject handling unit
214 Fiber recovery unit
216 Process water treatment unit of the paper machine
220 Material removal unit
221 Pre-acidification reactor
222 Enzyme supply line
225 Anaerobic reactor
230 Lime elimination unit
240 Filtration unit
270 Return line
270a, 270b Partial flow line
280 Process water supply line
300 Process water line
305 Mechanical material removal unit
310 Cooling unit
315 Biological treatment unit
400 Public body of water

The invention claimed is:

1. A method for cleaning process water containing biocide circulated in a system for producing paper from recycled paper, comprising a process water treatment step, which comprises at least one pre-acidification step and at least one anaerobic cleaning step, wherein at least some of the process water to be cleaned is subjected to hydrolysis and acidification in the at least one pre-acidification step and the process water thus treated is then brought into contact with anaerobic microorganisms in the at least one anaerobic cleaning step in order to break down impurities in the process water, wherein at least one saccharide-splitting enzyme is added in an amount of 1 to 100.000 units to the process water before or during the pre-acidification step, wherein one unit of enzyme is the amount of enzyme which converts 1 μmol of substrate per minute, wherein the saccharide-splitting enzymes to be added is added to the process water at two or more different points, wherein a portion of the saccharide-splitting enzymes to be added is added to the process water during the pre-acidification by means of a supply line into the pre-acidification reactor, whereas another portion of the saccharide-splitting enzymes to be added is added to the process water after the pre-acidification and/or after the anaerobic cleaning step the pH of the process water is set to 8.0 or lower at least during the at least one pre-acidification step and during the at least one anaerobic cleaning step, and the process water contains during its circulation during the method 1.0 to 8.0 kg of one or more biocides per ton of paper produced.

2. The method according to claim 1, characterized in that the pH of the process water is set to 8.0 or lower at least from the beginning of the at least one pre-acidification step until the end of the at least one anaerobic cleaning step.

3. The method according to claim 1, characterized in that the process water is fed to the process water treatment step from at least one unit of at least one stage of a recycled paper treatment device and, after the process water treatment step, is fed back to at least one unit of at least one stage of the recycled paper treatment device, wherein the unit is selected from one or more of a pulper, a sorting device, a dewatering unit, and an oxidation/reduction unit.

4. The method according to claim 1, characterized in that the pH of the process water is set from 4.0 to 8.0 at least from the beginning of the pre-acidification step until the end of the anaerobic cleaning step.

5. The method according to claim 1, characterized in that, before the pre-acidification, the process water is set to a pH in the range from 4.0 to 7.0 by adding pH-adjusting agents.

6. The method according to claim 1, characterized in that, before or during the anaerobic cleaning step, the process water is set to a pH in the range from 4.0 to 8.0 by adding pH-adjusting agents.

7. The method according to claim 1, characterized in that neither an alkaline hydrolysis nor a chemical hydrolysis is carried out during the entire process water treatment.

8. The method according to claim 1, characterized in that the biocide contains or is glutaraldehyde, 2-bromo-2-nitro-propane-1,3-diol, an isothiazolinone compound, a quaternary ammonium compound, a bromine compound, a chlorine compound and/or a peroxy compound.

9. The method according to claim 1, characterized in that at least one polysaccharide-splitting enzyme is added as the at least one saccharide-splitting enzyme to the process water before or during the pre-acidification step.

10. The method according to claim 1, characterized in that, before or during the pre-acidification step, at least one polysaccharide-splitting enzyme is added as the at least one saccharide-splitting enzyme to the process water, which is selected from the group consisting of amylases, cellulases, glucoamylases, xylanases, alpha-galactosidases, and any combination of two or more of the aforementioned enzymes.

11. The method according to claim 1, characterized in that, before or during the pre-acidification step, at least one oligosaccharide-splitting enzyme is added as the at least one saccharide-splitting enzyme to the process water.

12. The method according to claim 1, characterized in that, before or during the pre-acidification step, at least one oligosaccharide-splitting enzyme is added as the at least one saccharide-splitting enzyme to the process water, which is selected from the group consisting of lactases, maltases, invertases, and a combination thereof.

13. The method according to claim 1, characterized in that, before or during the pre-acidification step, at least one lipase is additionally added to the process water.

14. The method according to claim 1, characterized in that, before or during the pre-acidification step, at least one protease is additionally added to the process water.

15. The method according to claim 1, characterized in that, before or during the pre-acidification step, at least one polysaccharide-splitting enzyme and at least one lipase are added to the process water are added.

16. The method according to claim 1, characterized in that, before or during the pre-acidification step, at least one polysaccharide-splitting enzyme are added to the process water, but no protease is added during the process water treatment step.

17. The method according to claim 1, characterized in that the enzymes to be added is added at two or more different points, wherein a portion of the enzymes to be added is added to the process water during the pre-acidification by means of a supply line into the pre-acidification reactor, whereas the other portion of the enzymes to be added is added to the process water after the pre-acidification.

18. The method according to claim 1, characterized in that, before or during the pre-acidification step and before, during or after the enzyme addition, as one or more nutrients at least one nitrogen source and/or at least one phosphorus source are added to the process water.

19. The method according to claim 1, characterized in that the process water treatment step also comprises a decalcification step in which the process water is subjected to a dissolved air flotation step in which the pressure difference between the pressurization and the decompression in the dissolved air flotation step is at least 2 bar.

20. The method according to claim 19, characterized in that the process water is fed to the decalcification step after the anaerobic cleaning step and the pH of the process water is set from 7.0 to 8.5 during the dissolved air flotation step.

* * * * *